(12) United States Patent
Nelson

(10) Patent No.: US 7,992,106 B2
(45) Date of Patent: Aug. 2, 2011

(54) MENU TRAILS FOR A PORTABLE MEDIA PLAYER

(75) Inventor: Jonathan Nelson, Seattle, WA (US)

(73) Assignee: Varia Holdings LLC, Brooklyn, NY (US)

( * ) Notice: Subject to any disclaimer, the term of this patent is extended or adjusted under 35 U.S.C. 154(b) by 894 days.

(21) Appl. No.: 11/851,318

(22) Filed: Sep. 6, 2007

(65) Prior Publication Data

US 2008/0168397 A1 Jul. 10, 2008

Related U.S. Application Data

(60) Provisional application No. 60/883,992, filed on Jan. 8, 2007.

(51) Int. Cl.
*G06F 3/048* (2006.01)
(52) U.S. Cl. .......................... 715/854; 715/853
(58) Field of Classification Search .................. 715/853, 715/854
See application file for complete search history.

(56) References Cited

U.S. PATENT DOCUMENTS

| | | | | |
|---|---|---|---|---|
| 6,353,926 | B1 * | 3/2002 | Parthesarathy et al. | 717/170 |
| 6,661,437 | B1 * | 12/2003 | Miller et al. | 715/810 |
| 6,700,591 | B1 * | 3/2004 | Sharpe | 715/762 |
| 6,738,970 | B1 * | 5/2004 | Kruger et al. | 717/175 |
| 6,848,078 | B1 * | 1/2005 | Birsan et al. | 715/206 |
| 6,956,591 | B2 * | 10/2005 | Lundin et al. | 345/684 |
| 2002/0138582 | A1 * | 9/2002 | Chandra et al. | 709/206 |
| 2003/0139901 | A1 * | 7/2003 | Forman et al. | 702/179 |
| 2003/0156119 | A1 * | 8/2003 | Bonadio | 345/589 |
| 2004/0038675 | A1 * | 2/2004 | Criss et al. | 455/419 |
| 2005/0010635 | A1 * | 1/2005 | Schwesig et al. | 709/203 |
| 2005/0076309 | A1 * | 4/2005 | Goldsmith | 715/811 |
| 2005/0120306 | A1 * | 6/2005 | Klassen et al. | 715/765 |
| 2005/0132055 | A1 * | 6/2005 | Neogi | 709/227 |
| 2006/0095860 | A1 * | 5/2006 | Wada et al. | 715/771 |
| 2006/0095976 | A1 * | 5/2006 | Torres et al. | 726/28 |
| 2006/0206607 | A1 * | 9/2006 | Carden | 709/224 |
| 2006/0274719 | A1 * | 12/2006 | Guido et al. | 370/351 |
| 2007/0083556 | A1 * | 4/2007 | Plastina et al. | 707/104.1 |
| 2007/0282848 | A1 * | 12/2007 | Kiilerich et al. | 707/10 |
| 2008/0005263 | A1 * | 1/2008 | Baraev et al. | 709/217 |
| 2008/0059908 | A1 * | 3/2008 | Arvilommi | 715/841 |
| 2008/0104103 | A1 * | 5/2008 | Adams | 707/102 |
| 2008/0148190 | A1 * | 6/2008 | Schaff | 715/853 |
| 2008/0216020 | A1 * | 9/2008 | Plummer | 715/841 |
| 2008/0281867 | A1 * | 11/2008 | Kendall et al. | 707/104.1 |

* cited by examiner

*Primary Examiner* — Tuyetlien T Tran
(74) *Attorney, Agent, or Firm* — Schwabe, Williamson & Wyatt, P.C.

(57) ABSTRACT

A software and/or hardware facility for generating menu trails for a portable media player. A menu trail is a visual cue to a user, repeated on each menu item in the media player navigation interface, that highlights a path for the user to follow to a content item stored on or accessible by the media player, or to a capability of the media player. Menu trails may highlight new content and capabilities, or may highlight existing content or capabilities. A user using the media player may easily follow the visual cues through the player's menus in order to navigate to the content item or capability.

31 Claims, 4 Drawing Sheets

MENU TRAILS FOR A PORTABLE MEDIA PLAYER

CROSS-REFERENCE TO RELATED APPLICATION(S)

This application claims priority to, and incorporates by reference in its entirety, U.S. Provisional Application No. 60/883,992, filed on Jan. 8, 2007.

BACKGROUND

Portable media players are increasing in popularity. A portable media player is a transportable device that plays one or more media file types, including text, audio, video, graphics, animation, images, interactive, and other media file types.

A variety of pieces of media can be stored on or accessed by a portable media player. One or more pieces of media may be added to the media player over time. Media may be added to the media player manually by the user, such as by copying a CD of music to the media player or downloading media from a content site accessible over a network such as the Internet. Media may be also be added to the media player automatically, such as when media is downloaded by a network site or service according to a user's subscription. Media may be accessed on the portable media player in a variety of ways. For example, a network site or service may maintain a library or catalog of media that is accessible to a user. Media may be accessed by the user from the network site or service either manually or automatically. For example, a user may request that a piece of media be streamed to the user's media player. As another example, a network site or service may automatically stream a piece of media to a user's media player. With all of the media that can be added to or accessed by a portable media player, it can often be difficult for a user to keep track of which pieces of media are the newest additions to the media player.

In addition to media added to or accessed by a portable media player, the software that runs on a portable media player may periodically be updated by the manufacturer and downloaded, either manually or automatically, to the media player. A software update may offer new functionality, features, or other items to the media player. A user may wish to see a new functionality, feature, or other item added to the media player as a result of the software update.

One skilled in the art will appreciate that the contents and capabilities of a portable media player may change over time, in these and other ways. A method for calling the user's attention to content or capabilities, whether a piece of media, menu option, functionality, feature, or other item, on a portable media player would therefore be desirable.

DETAILED DESCRIPTION

A software and/or hardware facility for generating menu trails for a portable media player is described. A menu trail is a visual cue to a user, repeated with each menu item in the media player navigation interface, that highlights a path for the user to follow to a content item stored on or accessible by the media player, or to a capability of the media player. The visual cue may be a symbol (e.g., a star), highlighted text, bolded text, distinctive color text, or another visual cue. Menu trails may highlight new content and capabilities, or may highlight existing content or capabilities that the user may find interesting or helpful.

Embodiments may include a computer-readable medium whose contents cause a computing system to perform a method for accessing a target item on a portable media device, the method may comprise selecting a target item that is accessible via a navigation structure comprised of a plurality of nodes in a portable media device; identifying one or more nodes in the navigation structure that are traversable to reach the selected target item; and displaying to the user a visual cue with menu items that correspond to each of the identified one or more nodes and with the selected target item, so that a user may traverse a trail of menu items having visual cues in order to reach the target item. Target items may include, for example, a media file or a capability of the portable media device. Visual cues may include, for example, a symbol, highlighted text, bolded text, or distinctive color text.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Figure 1:
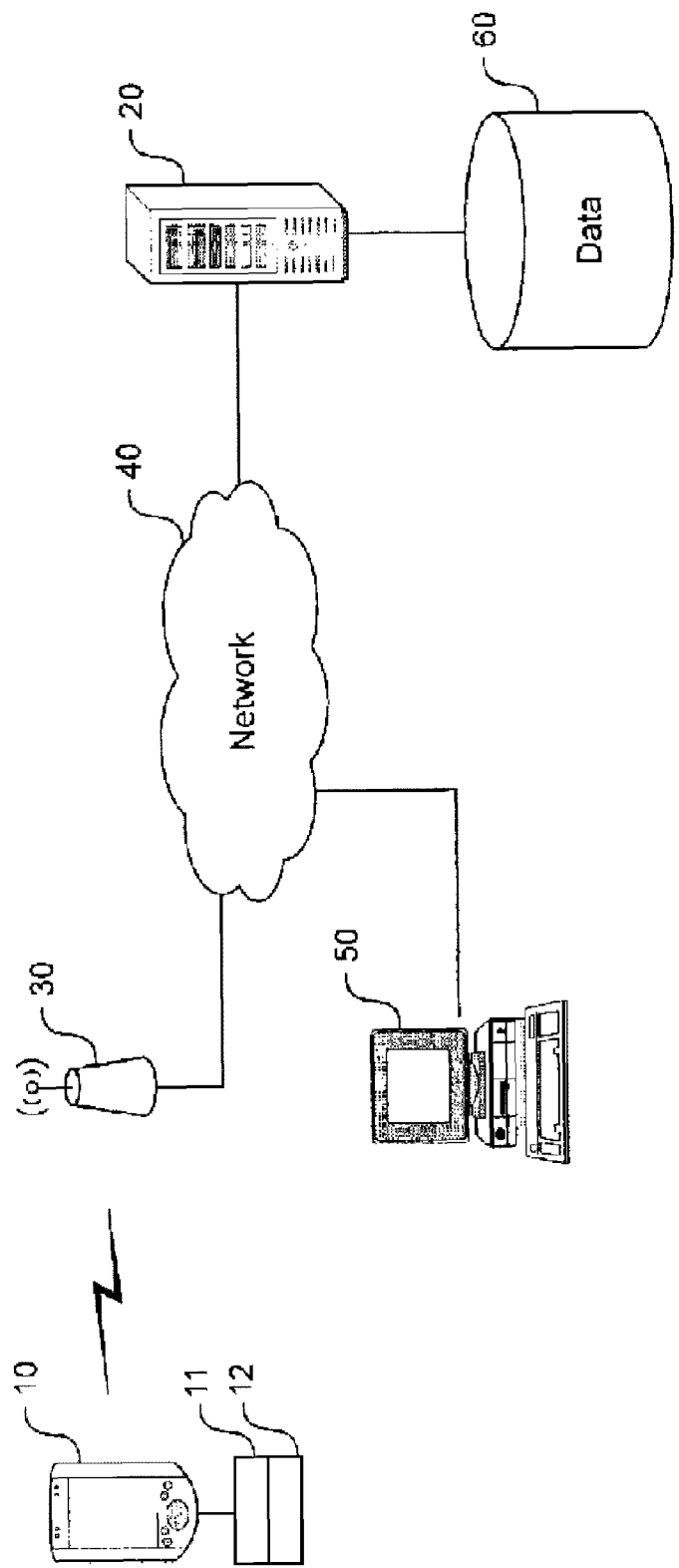
FIG. 1 is a block diagram of an environment in which a facility for generating menu trails operates.

FIG. 1 depicts a representative environment in which the facility operates. A portable media player 10, which may include computer-readable storage medium 12 configured to store media, and a processor 11 coupled with storage medium 12. The portable media player 10 may also access media from a media service 20 via a wireless access point 30 and a network 40. Alternatively or additionally, a computer 50 may access media from a media service 20 via the network 40. The facility may transmit the media between the computer 50 and the portable media device 10, such as when media stored on the computer is synched with media that is on the portable media player. Information about a user and/or the user's portable media device may be stored in a data area 60 that is coupled to the media service 20. The stored information may include the identity of media stored on the user's media player, a record of media accessed by the user, the version of device software installed, and other information.

Media may be added to the portable media player 10 in a variety of ways. A user may manually add media to the media player, such as by copying a CD of music to the media player, downloading media from the media service 20 via the wireless access point 30 and the network 40, or in another manner. Media may also be added to the media player automatically, such as through a user's subscription to the media service 20. That is, the facility may download media to the user's media player without the user having to manually or deliberately request the media. The facility may download media automatically to the user's media player based on the user's implicit interests, such as the types of media accessed by the user. For example, the facility may download media based on the media accessed most frequently by the user, the media ranked highest by the user, the media most recently played by the user, and/or another parameter. Alternatively or additionally, the facility may automatically download media based on information explicitly communicated by the user to the facility, such as personal information and interests conveyed when a user signs up for a service offered by the facility or in a user profile. For example, the user may request to have media automatically downloaded by the facility as the media become available, such as media of a particular type, genre, artist, category, or other parameter.

In addition to media being stored on a portable media player, media may be accessed by the media player 10 in a variety of ways. The media player may access media from a media service 20 via a wireless access point 30 and a network 40. Alternatively or additionally, a computer 50 may access media from a media service 20 via the network 40. The facility may transmit the media between the computer 50 and the portable media device 10, such as when media stored on the computer is synched with media that is on the portable media player. The media service may maintain a library or catalog of media that is made available to the user via the user's portable media player, computer, or in another manner. Media may be accessed by the user either manually or automatically. For example, a user may request that a particular piece of media be streamed to the user's media player. As another example, the facility may automatically stream a piece of media from the network site or service to the user's media player. The facility may stream media automatically to the user's media play based on the user's implicit or explicit interests, as described above.

In addition to media being added to or accessed by the portable media player, the software that runs on the media player may periodically be updated by the manufacturer, service provider, or in another manner. A software update may be downloaded to the media player, either manually or automatically. After a software update has been downloaded to and/or installed on the media player, the media player may offer new features, functionality, menu items, or other items (collectively, "capability" or "capabilities").

When a piece of media or capability is added to the media player, or when the facility wishes to draw the user's attention to one or more of these items (whether or not the item is "new"), the facility may generate a menu trail to draw the user's attention to the content or capability. The generation of a menu trail may be instigated by a local process operating on the media player, or may be instigated as a result of a command received from a process operating remotely from the media player. A menu trail is a visual cue to the user, repeated with each menu item in the media player navigation interface, that highlights a path for the user to follow to a content item or capability on the media player. The visual cue may be a symbol (e.g., a star), highlighted text, bolded text, distinctive color text, or another visual cue. A user using the media player may easily follow the visual cues through the player's menu structure in order to navigate to the content item or capability.

Figure 2:
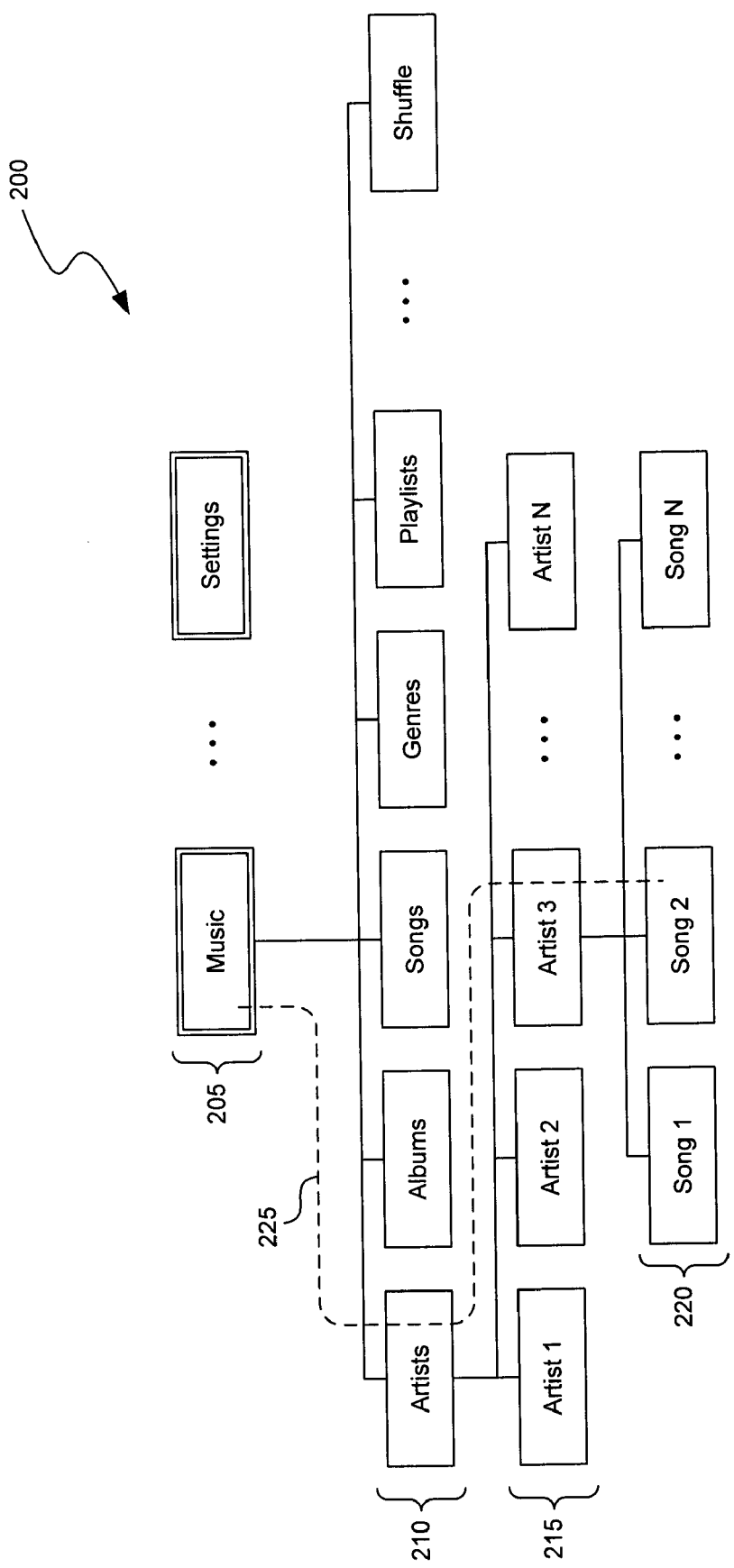
FIG. 2 is a block diagram of a navigation structure of a portable media player.

FIG. 2 is a diagram of a portion of a representative navigation structure 200, or graph, used by portable media players to allow users to navigate to content or capabilities within a media player. The navigation structure is depicted in the form of a tree, with each node in the tree representing a menu item that may be selected by the user. Each group of nodes in the tree that are connected to a single parent node represents items that may appear together in a menu list presented to a user. A user typically traverses downwards within the navigation structure by selecting one of the items in the menu list and upwards by providing an indication that they would like to return to a parent node. In the depicted navigation structure, an uppermost or top level 205 includes menu items like "music" to allow a user to access music on the media player and "settings" to allow the user to change various settings on the media player. If the user selects "music" from the top level, the user is presented with menu items from a second level 210 such as "artists," "albums," "songs," etc. The user may continue to select items from displayed menus to traverse a third level 215 and fourth level 220 of the navigation structure. For example, in order to reach "song 2" in the fourth level, a user may select "music," "artists," "artist 3," and "song 2" in succession, as indicated by a traversal path 225. It will be appreciated that the navigation structure 200 may have any number of levels and any number of nodes at each level. The navigation structure may be hierarchical, acyclic, or another structure. Moreover, each node may have one or more different traversal paths that allow a user to reach the node.

In order to store the existence of a menu trail, each node in the navigation structure 200 may include one or more flags that may be set to indicate the presence of a trail associated with that node. For example, to add song 2 to the menu trail the facility may set a flag associated with the song 2 node to "on." The facility then traverses upwards in the navigation structure, setting the artist 3 node flag to "on," the artists node flag to "on," and finally the music node flag to "on." When any menu is displayed on a portable media player, a check is made to see if the flag associated with a node indicates the presence of a menu trail. If a flag is detected as being on, the menu item associated with that node is depicted as having a menu trail. Such flags may remain in the "on" state until the menu trail is to be removed by the facility in accordance with one of the approaches described below. To remove the menu trail, the facility clears the flags associated with the trail and sets them to "off." Those skilled in the art will appreciate that other techniques may be used to store the presence of a menu trail, such as a table, a linked list, or other data structure.

Figure 3A:
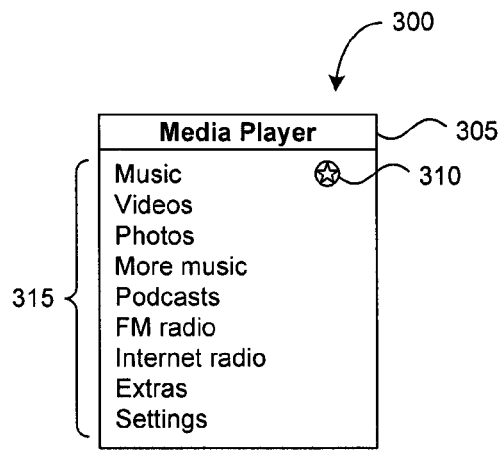
FIGS. 3A-3D are screen shots depicting a menu trail to a song on a portable media player screen.

In order to guide the user down a particular traversal path to a content item or capability, the facility introduces an appropriate visual cue at each level of menu on the appropriate navigation screens. For example, FIGS. 3A-3D are representative screen shots depicting a menu trail to a song, Song N. FIG. 3A is a representative screen shot 300 that depicts a Media Player home screen 305. The home screen 305 may be the uppermost menu level and may be presented to the user when the media player is turned on or at various other times. The home screen 305 may provide the user with a list 315 of selectable options, including categories of media that may be on the device (e.g., Music, Video, Photos, Podcasts, Radio, and other types of media), device settings, and other options. A visual cue 310 may be displayed next to the "Music" menu item to indicate the start of a menu trail, such as a menu trail to a Song N. The visual cue may be a star (as depicted in FIG. 3A) or it may be a change in font, highlighting, or any other visual cue that calls attention to the menu item. The menu trail may be provided by the facility for a variety of reasons. For example, Song N may have been recently added to the media player, and the facility may provide a menu trail to allow a user to locate the song. As another example, a user may be searching for Song N, and the facility may provide a menu trail to teach a user how to locate the song on the media player. As another example, Song N may have a limited period that it remains accessible on the portable media player, and the facility may provide a menu trail to both signify that the song is expiring and to provide a path to the song so that a user may listen to the song before it expires.

Figure 3B:
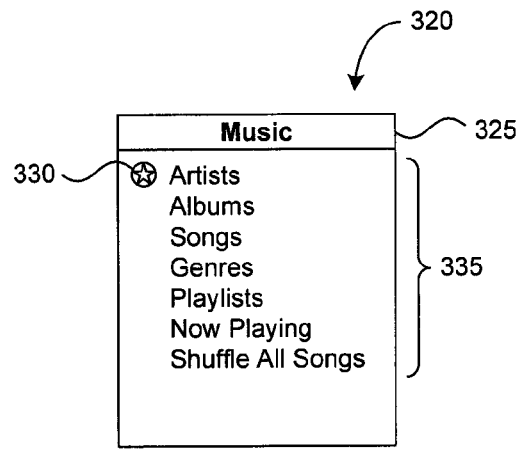

If the user selects "Music" from the list of menu items 315 on the Media Player home screen 305, the user is presented with a Music screen 325, such as that depicted in the representative screen shot 320 illustrated by FIG. 3B. The Music screen 325 may present the user with a list 335 of selectable options, including groupings of music (e.g., Artists, Albums, Songs, Genres, Playlists, and other groupings) and other options (e.g., show the song "Now Playing," Shuffle All Songs, and other options). FIG. 3B depicts a visual cue 330 next to the "Artists" menu item. A visual cue may be present next to more than one menu item if an item falls within more than one category represented by the menu items (i.e., there are multiple menu trails to the same item). A visual cue may also be present next to more than one menu item if multiple menu trails are being simultaneously displayed by the facility to different content items or capabilities. If multiple menu trails are being displayed, a different visual cue may be used for each trail to allow a user to distinguish between the trails. For example, a star icon may be used to depict one menu trail, and a moon icon may be used to depict a second menu trail.

Figure 3C:
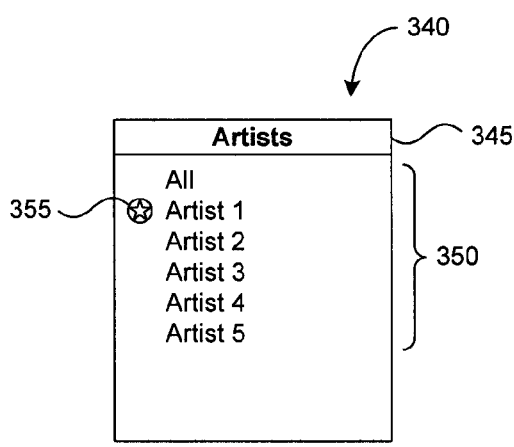

If the user selects "Artists" from the list of menu items 335 on the Music screen 325, the user is presented with an Artists screen 345, such as that depicted in the representative screen shot 340 illustrated by FIG. 3C. The Artists screen 345 may present the user with a list 350 of artists of music stored on or accessible by the device, options (e.g., play "All"), and other items. FIG. 3C depicts a visual cue 355 displayed next to the "Artist 1" menu item to indicate that a user should select Artist 1 to follow the menu trail.

Figure 3D:
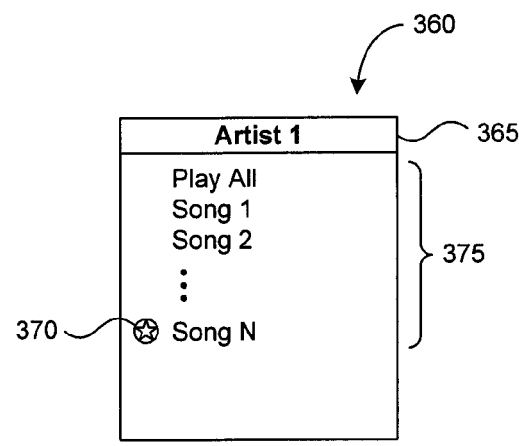

If the user selects "Artist 1" from the list of menu items 350 on the Artists screen 345, the user is presented with an Artist 1 screen 365, such as that depicted in the representative screen shot 350 illustrated by FIG. 3D. The Artist 1 screen 365 may present the user with a list of songs by Artist 1, options (e.g., "Play All"), and other items. FIG. 3D depicts a visual cue 370 displayed next to the "Song N" menu item to indicate that the menu trail terminates at Song N. In some embodiments, a different visual cue may be used to distinguish a menu item associated with an intermediate node on the menu trail from the menu item associated with the termination node of the menu trail.

In some embodiments, the same visual cue is presented on each level of the path to the highlighted content item or capability. In the above example, the same visual cue (e.g., a star) is displayed next to each of Music, Artists, Artist 1, and Song N, as depicted in FIGS. 3A-3D. Alternatively, a different visual cue may be presented on each level of the path to the highlighted content item or capability.

Figure 4A:
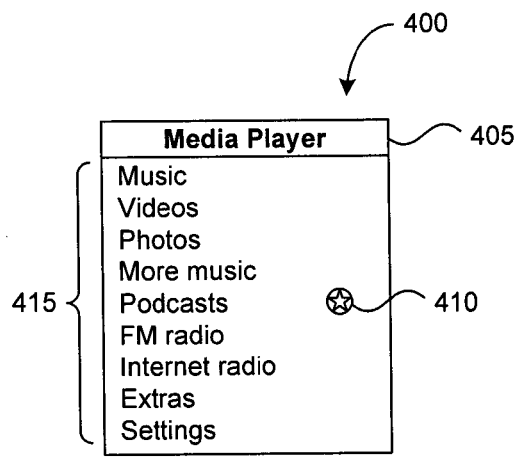
FIGS. 4A-C are screen shots depicting menu trails to podcast episodes on a portable media player screen.
Figure 4B:
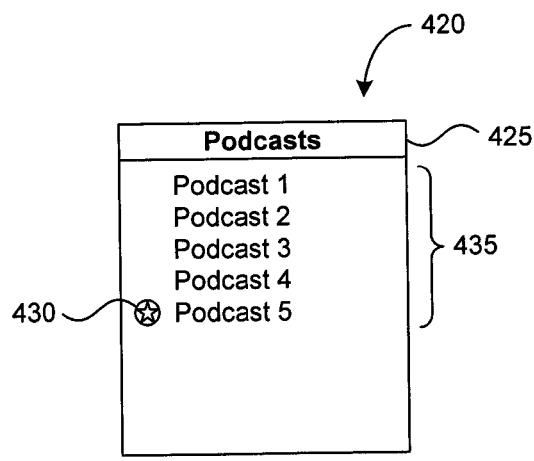
Figure 4C:
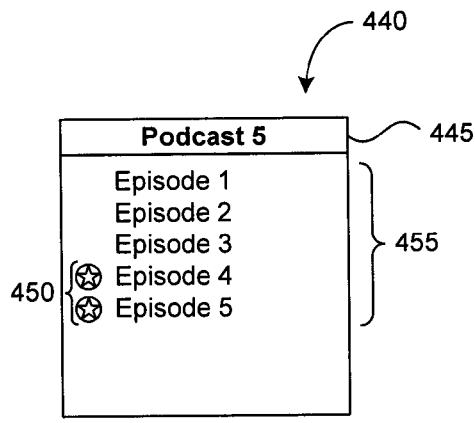

If the facility would like to draw the user's attention to more than one content item or capability, the facility may present more than one visual cue to the user, on one or more navigation screens. For example, FIGS. 4A-4C are representative screen shots that depict menu trails to two new podcast episodes. FIG. 4A is a representative screen shot 400 that depicts a Media Player home screen 405, as described above. When a new podcast episode is available, the facility presents a visual cue 410 next to the "Podcasts" menu item to indicate to the user that two new podcast episodes are available. Rather than provide two visual cues indicating the presence of two menu trails, the facility provides a single visual cue that is indicative of the two trails.

If a user selects "Podcasts" from a list of menu items 415 on the Media Player home screen 405, the user is presented with a Podcasts screen 425, such as that depicted in the representative screen shot 420 in FIG. 4B. FIG. 4B illustrates an intermediate menu from which the user can choose a podcast. The Podcasts screen 425 may present the user with a list of all podcasts stored on or accessible by the media player. FIG. 4B depicts a visual cue 430 next to the "Podcast 5" menu item to indicate that new podcast episodes for Podcast 5 are available.

If the user selects "Podcast 5" from the list of menu items 435 on the Podcasts screen 425, the user is presented with a Podcast 5 screen 445, such as that depicted in the representative screen shot 440 in FIG. 4C. The Podcast 5 screen may present the user with a list of all episodes in Podcast 5 that are stored on or accessible to the user's media player. FIG. 4C depicts a visual cue 450 next to the "Episode 4" and "Episode 5" menu items, to indicate that two new podcast episodes have been added to, or are accessible by, the media player. By following the visual cue on each of the menus, the user is led to the two new podcast episodes that have been downloaded to the device or are available from a network content site or service. Podcasts may be automatically downloaded to a media player without the knowledge of the podcast subscriber, or may be published by a site or service on a sporadic basis. The facility therefore serves a valuable purpose in that it allows a user to quickly receive notice of a new podcast as well as locate the podcast on the user's media player.

The facility may also create a menu trail when it would like the user to complete a desired task, such as downloading and/or installing a new version of software for the media player. The operating system or other software that runs on a portable media player may periodically be updated by the manufacturer, service provider, or in another manner. A software update may be downloaded to and/or installed on the media player, either manually or automatically. For example, the user may manually download and/or install a software update by selecting a menu item (e.g., "download software update" or "install software update") on a media player navigation screen. The facility may create a menu trail to the menu item when a software update is available for download. Alternatively, the facility may automatically download and/or install a software update on the media player when the update becomes available. The facility may create a menu trail to a menu item (e.g., "software update installed") to notify the user that a software update has been downloaded and/or installed.

The facility may also create a menu trail when a new capability is added to the media player. For example, after a software update has been downloaded and installed on the media player, the media player may offer one or more new functionalities, features, menu items, or other items. For example, a software update may provide a new menu item that allows a user to view a biography of an artist stored on or accessible by the media player. The facility may create a menu trail to a newly added capability to draw the user's attention to the capability. In addition, the facility may create a menu trail to an existing capability to draw the user's attention to an existing capability.

In some embodiments, there may be more than one traversal path through the media player navigation structure that allows a user to reach a content item or capability. When multiple traversal paths exist through the navigation structure, the facility may select one path to display as a menu trail to a user or it may select multiple paths to display as menu trails. The facility may select which path (or paths) to display as a menu trail by selecting the path that requires the user to traverse the fewest number of nodes, by selecting the path that is most logically related to the content item or capability being discovered (e.g., by directing a user through a "device settings" menu in order to find a new capability of the media player, even though the new capability may also be discovered from one of the content items on the media player), by selecting a path commonly used by other users in locating the content item or capability, or in another manner.

A menu trail and its corresponding visual cue(s) may disappear under a variety of circumstances. In some circumstances, a menu trail may disappear when the user views the menu associated with the target item (i.e., the node associated with the end of the menu trail). For example, in the instance illustrated by FIGS. 3A-3D, the menu trail would disappear when the user selects and views the Artist 1 menu, because Song N is the target item. That is, the visual cues would disappear from Music, Artists, Artist 1, and Song N when the user views the Artist 1 menu.

In some circumstances, a menu trail may not disappear until the user selects the target item. In the above illustration, the menu trail would therefore disappear when the user selects Song N, but would not disappear when the user merely viewed the Artist 1 menu.

In some circumstances, the majority of a menu trail may disappear once the user follows the trail, but the visual cue will remain on the target item until the item is selected by the user. In the above illustration, when the user follows the menu trail to the Artist 1 screen, the visual cues will disappear from the Music, Artists, and Artist 1 menus, but the visual cue will remain next to Song N until Song N is selected (i.e., played).

In some circumstances, the visual cues may decrease in intensity (i.e., fade) each time the user views the menu from which the target item may be selected. In the above illustration, every time the user views the Artist 1 menu, the visual cues indicating the menu trail will decrease in intensity. Once the user views the Artist 1 menu a certain number (e.g., five) of times, the visual cues, and thus the menu trail, will disappear. The visual cues may decrease in intensity regardless of whether the user selects the target item or, alternatively, the visual cues may decrease in intensity only if the user selects the target item.

In some circumstances, the visual cues may decrease in intensity (i.e., fade) as a function of time. For example, the visual cues may decrease in intensity each day for a period of five days, at which point the visual cues, and thus the menu trail, will disappear. One skilled in the art will appreciate that a menu trail and its corresponding visual cues may disappear in a variety of other ways and in various combinations of the previously described ways.

In some embodiments, the user may have the option to turn menu trails on and off on the user's portable media player. For example, a user may select never to have menu trails displayed on the media player.

In some embodiments, a user may manually select to have menu trails displayed by the facility. The user may determine one or more parameters for the menu trails. For example, a user may request that the facility display menu trails to all content items added or newly accessible within a certain time period (e.g., within the last 2 days, within the last month). As another example, a user may request that the media player display menu trails to all content items of a certain type, by a certain artist, or that satisfies one or more other parameters.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method for accessing a target item using a portable device, the method comprising:

identifying, by the portable device, a period of time during which the target item is accessible by the portable device, wherein the target item is configured to add a capability to the portable device;

determining, by the portable device, based at least on the period of time, that the target item is potentially of interest to the user; and in response to said determining, associating a first visual cue with a first selectable menu item of a first user interface menu, the first user interface menu representing a node of a navigation structure having a plurality of nodes, and the first selectable menu item representing the target item, wherein the first selectable menu item is selectable by the user to add the capability to the portable device;

associating, by the portable device, a second visual cue with a second selectable menu item of a second user interface menu, the second user interface menu representing a second node of the navigation structure, the second selectable menu item representing said first node, wherein the second selectable menu item is selectable by the user to access the first user interface menu; and removing, by the portable device, the second visual cue associated with the second selectable menu item in response to a viewing of the second user interface menu by the user, wherein the first visual cue remains associated with the first selectable menu item of the first user interface menu until the user selects the first selectable menu item.

2. The method of claim 1 wherein the target item comprises a software update.

3. The method of claim 1 wherein the target item comprises a new functionality, feature, or menu item.

4. The method of claim 1 wherein the first visual cue is a symbol.

5. The method of claim 1 wherein the first visual cue is highlighted text, bolded text, or distinctive color text.

6. The method of claim 1, wherein said period of time is a period of time during which the target item was added to the portable device.

7. The method of claim 1, wherein said period of time is a period of time during which the target item is accessible from a network site by the portable device.

8. The method of claim 1 wherein the first and the second visual cues are the same.

9. The method of claim 1 wherein the second visual cue associated with the second selectable menu item is different from the first visual cue associated with the first selectable menu item.

10. The method of claim 1 wherein the target item is configured to perform a task, and the first selectable menu item is selectable by the user to have the task performed.

11. The method of claim 1, further comprising removing, by the portable device, the first visual cue in response to a selection of the first selectable menu item by the user.

12. The method of claim 1 wherein the first visual cue decreases in intensity each time the user views the first user interface menu.

13. The method of claim 1 wherein the first visual cue decreases in intensity over time.

14. The method of claim 1 wherein the identifying is pursuant to a user request.

15. The method of claim 1, further comprising automatically downloading, by the portable device, the target item, based at least on one or more implicit interests of the user.

16. A portable device comprising:
   a processor; and
   a tangible non-transitory computer-readable storage medium coupled with the processor and having instructions configured to be executed by the processor, which in response to execution, cause the portable device to:
      identify a period of time during which a target item is accessible by the portable device, wherein the target item is configured to add a capability to the portable device,
      determine, based on the period of time, that the target item is potentially of interest to the user,
      in response to determining that the target item is potentially of interest to the user, associate a first visual cue with a first selectable menu item of a first user interface menu, the first user interface menu representing a first node of a navigation structure having a plurality of nodes, and the first selectable menu item representing the target item, wherein the first selectable menu item is selectable by the user to add the capability to the portable device,
      associate a second visual cue with a second selectable menu item of a second user interface menu, the second user interface menu representing a second node of the navigation structure, the second selectable menu item representing said first node, wherein the second selectable menu item is selectable by the user to access the first user interface menu, and
      remove the second visual cue associated with the second selectable menu item in response to a viewing of the second user interface menu by the user, wherein the first visual cue remains associated with the first selectable menu item of the first user interface menu until the user selects the first selectable menu item.

17. The portable device of claim 16 wherein the target item comprises a software update.

18. The portable device of claim 16 wherein the target item comprises a new functionality, feature, or menu item.

19. The portable device of claim 16 wherein the first visual cue is a symbol.

20. The portable device of claim 16 wherein the first visual cue is highlighted text, bolded text, or distinctive color text.

21. The portable device of claim 16 wherein the first and the second visual cues are the same.

22. The portable device of claim 16, wherein the instructions are further configured, in response to execution, to cause the portable device to automatically download the target item from the server.

23. The portable device of claim 16, wherein said period of time is a period of time during which the target item was added to the portable device.

24. The portable device of claim 16, wherein said period of time is a period of time during which the target item is accessible from a network by the portable device.

25. The portable device of claim 16 wherein the target item is configured to perform a task.

26. The portable device of claim 16, wherein the target item is configured to download software to the portable device or to install software on the portable device.

27. The portable device of claim 16, wherein the instructions are further configured, in response to execution, to cause the portable device to remove the first visual cue in response to selection of the first selectable menu item by the user.

28. The portable device of claim 16, wherein the instructions are further configured, in response to execution, to cause the portable device to decrease the intensity of the first visual cue each time the user views the first user interface menu.

29. The portable device of claim 16, wherein the instructions are further configured, in response to execution, to cause the portable device to decrease the intensity of the first visual cue over time.

30. A method of generating a trail of visual cues to a target item on a portable media device, the method comprising:
   selecting a target item that is accessible via a navigation structure comprised of a plurality of nodes in the portable media device;
   identifying one or more nodes in the navigation structure that are traversable to reach the selected target item; and
   displaying to the user a visual cue with menu items that correspond to each of the identified one or more nodes and with the selected target item, so that a user is able to traverse a trail of menu items having visual cues in order to reach the target item,
   wherein the visual cues associated with the menu items disappear after the user views a navigation screen from which the target item is selectable, but the visual cue associated with the target item remains visible until the user selects the target item.

31. A system for generating a trail of visual cues to a target item on a portable media device, the system comprising:
   a tangible non-transitory computer-readable storage medium having instructions operable, upon execution, to cause the portable media device to:
      select a target item that is accessible via a navigation structure comprised of a plurality of nodes in the portable media device,
      identify one or more nodes in the navigation structure that are traversable to reach the selected target item, and
      display to the user a visual cue with menu items that correspond to each of the identified one or more nodes and the selected target item, so that a user is able to traverse a trail of menu items having visual cues in order to reach the target item,
   wherein the visual cues associated with the menu items disappear after the user views a navigation screen from which the target item is selectable, but the visual cue associated with the target item remains visible until the user selects the target item.

* * * * *